United States Patent
Bertz et al.

(10) Patent No.: US 10,212,258 B2
(45) Date of Patent: Feb. 19, 2019

(54) COMMUNICATION PACKET HEADER DATA COMPRESSION

(71) Applicant: Sprint Communications Company L.P., Overland Park, KS (US)

(72) Inventors: Lyle T. Bertz, Lee's Summit, MO (US); Ronald R. Marquardt, Woodinville, WA (US); Ihab Amin Guirguis, Chantilly, VA (US); Serge M. Manning, Plano, TX (US); Roger Danforth Bartlett, Merriam, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/881,969

(22) Filed: Jan. 29, 2018

(65) Prior Publication Data

US 2018/0152548 A1 May 31, 2018

Related U.S. Application Data

(63) Continuation of application No. 15/069,656, filed on Mar. 14, 2016, now Pat. No. 9,924,000.

(51) Int. Cl.
*H04L 29/06* (2006.01)
*H04L 12/805* (2013.01)

(52) U.S. Cl.
CPC .............. *H04L 69/04* (2013.01); *H04L 47/36* (2013.01); *H04L 69/22* (2013.01)

(58) Field of Classification Search
CPC .................. H04L 69/04; H04L 69/22
See application file for complete search history.

(56) References Cited

U.S. PATENT DOCUMENTS

| | | |
|---|---|---|
| 6,608,841 B1 | 8/2003 | Koodli |
| 8,548,004 B2 | 10/2013 | Watanabe |
| 8,750,334 B2 | 6/2014 | Singh |
| 8,804,765 B2 | 8/2014 | Pelletier et al. |
| 9,072,007 B2 | 6/2015 | Liu et al. |
| 9,450,604 B1 | 9/2016 | Kumaran et al. |
| 2004/0202167 A1 | 10/2004 | Jonsson et al. |
| 2006/0104266 A1 | 5/2006 | Pelletier et al. |
| 2007/0189278 A1 | 8/2007 | Tu et al. |
| 2008/0025312 A1 | 1/2008 | Kuppuswamy et al. |

(Continued)

FOREIGN PATENT DOCUMENTS

WO 2011020108 2/2011

*Primary Examiner* — Kevin C. Harper

(57) ABSTRACT

A data communication system compresses packet headers. A transmitter executes state machines to process a data packet and determine if a transmitter state machine is transferring Interdependent Machine Output (IMO) data. The transmitter generates an IMO vector that indicates if any IMO data is in the data packet. If IMO is present, then the transmitter augments the IMO vector to indicate the individual transmitter state machines that transferred the IMO data. The transmitter transfers the data packet with the IMO vector to a receiver. The receiver processes the IMO vector to determine if any IMO data is transferred in the data packet. If IMO data is transferred, then the receiver processes the augmented IMO vector to transfer the IMO data to individual receiver state machine that correspond to the transmitter state machines that transferred the IMO data.

20 Claims, 7 Drawing Sheets

(56) References Cited

U.S. PATENT DOCUMENTS

| | | |
|---|---|---|
| 2008/0095175 A1 | 4/2008 | Grandhi et al. |
| 2008/0151901 A1 | 6/2008 | Yang et al. |
| 2010/0027497 A1 | 2/2010 | Pelletier |
| 2014/0133454 A1 | 5/2014 | Chan et al. |
| 2014/0161036 A1* | 6/2014 | Venkatachalam Jayaraman ......... H04L 65/601 370/328 |
| 2015/0124699 A1 | 5/2015 | Chebolu et al. |
| 2015/0257037 A1 | 9/2015 | Chebolu et al. |

* cited by examiner

COMMUNICATION PACKET HEADER DATA COMPRESSION

RELATED CASES

This patent application is a continuation of U.S. patent application Ser. No. 15/069,656 that was filed on Mar. 14, 2016 and is entitled "COMMUNICATION PACKET HEADER DATA COMPRESSION." U.S. patent application Ser. No. 15/069,656 is hereby incorporated by reference into this patent application.

TECHNICAL BACKGROUND

Data communication systems exchange user data to provide various services like media streaming, audio/video conferencing, data messaging, and internet access. The data communication systems use several communication protocols to transfer the user data. Exemplary communication protocols include Long Term Evolution (LTE), IEEE 802.3 (Ethernet), IEEE 802.11 (Wi-Fi), and Internet Protocol (IP). Within a given communication protocol, there may be multiple underlying communication protocols. For example, an LTE data packet using the LTE protocol uses underlying protocols like Media Access Control (MAC), Radio Link Control (RLC), and Packet Data Convergence Protocol (PDCP).

To improve efficiency, data communication systems perform data compression on user data. The data compression process removes redundant and unnecessary aspects of the user data and a reciprocal decompression process rebuilds the original data. In a simplified compression example, a string of ten all-zero bits could be replaced by a special three-bit code at the compressor, and then the ten all-zero bits would be re-inserted for the three-bit code at the decompressor.

Some forms of data compression transfer only changes to a data set instead of repeatedly transferring the complete and modified data set. For example, video compression technologies often transfer a complete image and then transfer modifications to the image instead of transferring the complete modified image. In another example, voice compressors drop silence data (white noise) and the voice decompressor automatically regenerates white noise at the receiver.

Robust Header Compression (RoHC) is a common form of packet header compression. RoHC is typically used to efficiently transmit wireless data communication packets over the air. RoHC initializes by transferring full headers. In first order RoHC, header differences are transferred instead of full headers. In second order RoHC, sequence numbers and checksums are transferred instead of header differences. RoHC decompressors infer and retrieve stored header data based on the sequence numbers and checksums.

RoHC compressors and decompressors each comprise multiple state machines, and each state machine usually handles a particular protocol. For example, an LTE RoHC compressor and decompressor each have a MAC state machine, RLC state machine, and PDCP state machine. The RoHC state machines run in parallel at the transmitter and receiver, but they typically process a given data packet in series. The data packet is processed one state machine at a time as the outer headers are initially processed by the pertinent state machines before the inner headers are processed other state machines for the inner protocols.

The state machines generate Machine Output (MO) data that indicates header data. The state machines also generate Interdependent MO (IMO) data that represents a data dependency between state machines. For example, an RLC state machine in a transmitter may send IMO data to a PDCP state machine in the same transmitter. The proper operation of this PDCP state machine depends on the IMO data from the RLC state machine. In another example, the PDCP state machine in the transmitter may send IMO data to a PDCP state machine in receiver. The proper operation of the PDCP state machine in the receiver depends on the IMO data from the PDCP state machine in the transmitter. In addition to IMO data, the state machines also receive external data. For example, the state machines may receive a metric like packet length from an Analog-to-Digital (A/D) convertor. The state machines may infer some data from the MO data or the external data. For example, a header size could be readily inferred from the packet size minus the payload size.

Unfortunately, current packet header compression technologies like RoHC have not been properly optimized for their underlying protocols and media services. Packet header compression for services like Voice over LTE (VoLTE) remains inefficient.

Technical Overview

A data communication system having a transmitter and a receiver performs packet header compression. The transmitter executes state machines to process a data packet and determine if a transmitter state machine is transferring Interdependent Machine Output (IMO) data. The transmitter generates an IMO vector that indicates if any IMO data is in the data packet. If IMO is present, then the transmitter augments the IMO vector to indicate the individual transmitter state machines that transferred the IMO data. The transmitter transfers the data packet with the IMO vector to the receiver. The receiver processes the IMO vector to determine if any IMO data is in the data packet. If IMO data is transferred, then the receiver processes the augmented IMO vector to transfer the IMO data to the individual receiver state machines that correspond to the transmitter state machines that transferred the IMO data.

DETAILED DESCRIPTION

Figure 1:
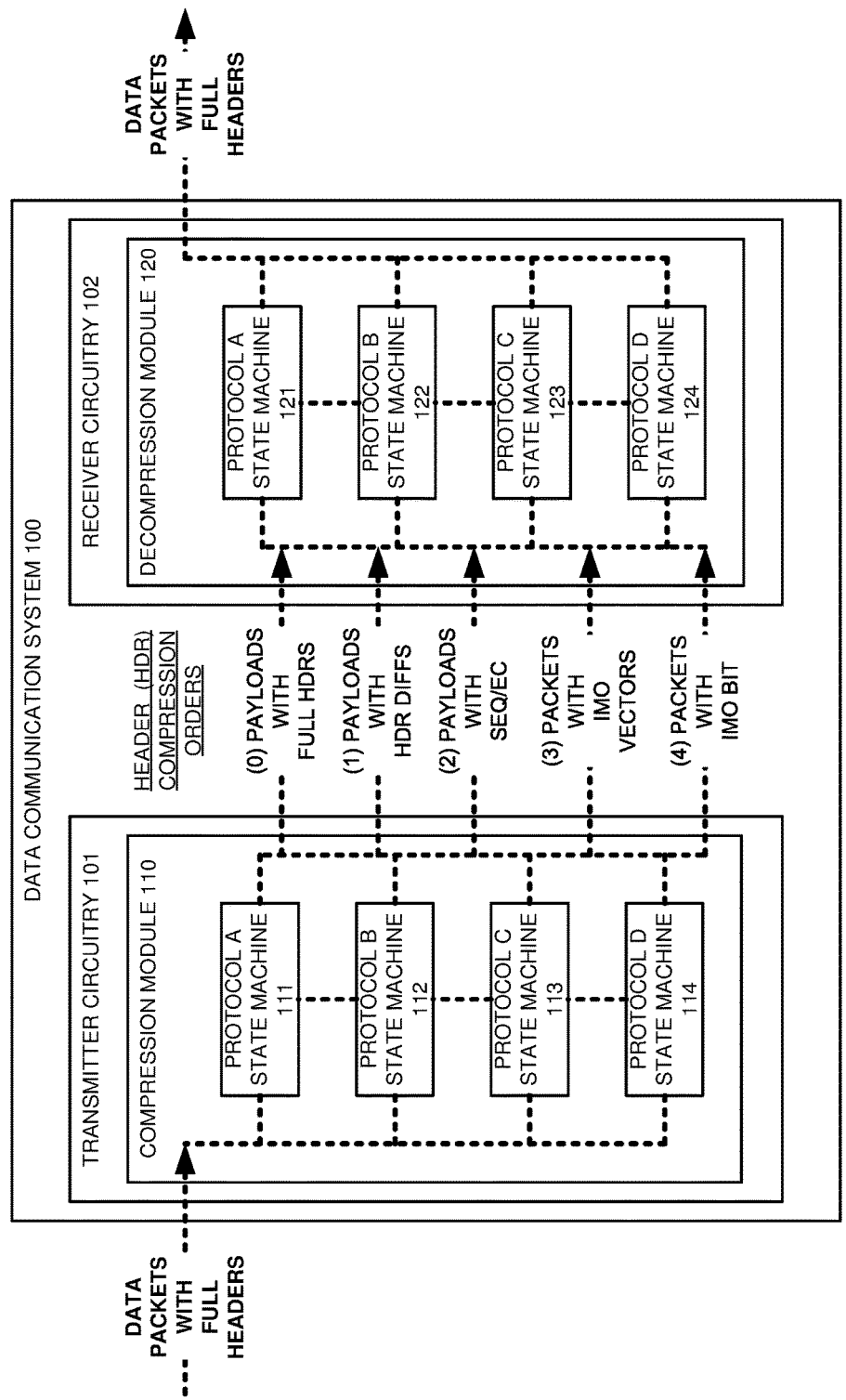
FIG. 1 illustrates a data communication system to transfer data communication packets with compressed headers.

FIG. 1 illustrates data communication system 100 to transfer data communication packets with compressed headers. The data communication packets may transport voice, video, messaging, or some other user data service. Data communication system 100 comprises transmitter circuitry 101 and receiver circuitry 102 that reside in communication systems like phones, computers, base stations, gateways, servers, or some other intelligent machines with communication transceivers. For example, transmitter circuitry 101 may reside in a wireless tablet computer and receiver circuitry 102 may reside in a wireless base station. Typically, data communication system 100 would include reciprocal transmitter/receiver circuitry operating a wireless downlink but the downlink is omitted for clarity.

Transmitter circuitry 101 and receiver circuitry 102 comprise Central Processing Units (CPUs), bus interfaces, memories, software, and communication transceivers. Transmitter circuitry 101 includes compression module 110. Receiver circuitry 102 includes decompression module 120. Compression module 110 comprises state machines 111-114 for respective protocols A-D. Decompression module 120 comprises corresponding state machines 121-124 for respective protocols A-D. Modules 110 and 120 and state machines 111-114 and 121-124 comprise software that is stored on one or more computer readable storage media like flash drives, disc drives, or some other memory apparatus. When executed by data processing circuitry like circuitry 101-102, this software directs the data processing circuitry to compress and decompress data packet headers as described herein.

Transmitter/Receiver circuitry 101-102 use protocols A-D to communicate over a physical link like air, metal, or glass. The physical link uses communication formats like Internet Protocol (IP), Long Term Evolution (LTE), IEEE 802.3 (Ethernet), and IEEE 802.11 (Wi-Fi). The communication protocols are often comprised of a series of sub-protocols, but for clarity, both the protocols and their sub-protocols are referred to herein as protocols. For example, the LTE protocol has individual protocols and state machines for: physical media, Media Access Control (MAC), Radio Link Control (RLC), and Packet Data Convergence Protocol (PDCP).

Transmitter circuitry 101 and receiver circuitry 102 progress through sequence of header (HDR) compression orders. In zero (0) order compression, circuitry 101-102 initializes with packet flow data, so full headers are sent. In first (1) order compression, transmitter circuitry 101 transfers payloads with header differences from the initialization state. In second (2) order compression, transmitter circuitry 101 transfers payloads with sequence numbers (SEQ) and error correction data (EC). Receiver state machines 121-124 infer header data from the SEQ, EC, and external data.

In third order compression, transmitter circuitry 101 transfers payloads with Interdependent Machine Output (IMO) vectors that indicate the presence of IMO data in individual data packets. The IMO vectors also indicate the individual transmitter state machines 111-114 that sent the IMO data and/or the individual receiver state machines 121-124 that should receive the IMO data. The applicable receiver state machines 121-124 process the IMO data to develop their header data. In third order compression, receiver circuitry 102 obtains a per-packet metrics from Layer 1 devices. Receiver state machines 121-124 then infer header data from the Layer 1 metrics. For example, a Layer 1 Analog-to-Digital (A/D) converter may transfer metrics like packet length, payload size, system time, and the like.

In fourth order compression, transmitter circuitry 101 transfers payloads with single-bit IMO vectors as the headers. The single-bit IMO vectors indicate a lack of IMO data in an individual data packet. In fourth order compression, receiver state machines 121-124 infer header data based on the single-bit IMO vector and Layer 1 metrics like payload size and system time.

The header compression procedure quickly initializes through zero order to the first order. Header compression toggles between the zero and first orders as re-initialization is required. After initialization and header changes settle, the procedure moves to second order header compression with SEQ/EC transfers. Header compression toggles between the first and second orders as header changes are detected and processed in the first order.

In third order header compression, IMO vectors and data are transferred. SEQ/EC and other second order data is inferred for the packet flow or omitted. The header compression procedure transitions between second and third orders based on the need to get SEQ/EC or other second order data. In some examples, second order compression is omitted altogether and the first and third orders are directly linked. The header compression procedure transitions between third and fourth orders based on the presence of the IMO data or the order change data.

If no IMO data or order change data is present, then the header compression procedure moves to the fourth order where only single-bit IMO vectors are sent as packet headers. Header compression toggles between the third and fourth orders as IMO data is processed in the third order. Corresponding transmitter/receiver state machines (like 111/121) should stay in the same compression order, but transmitter state machines (like 111/112) may use different compression orders. For example, state machines 111 and 121 may stay in first order compression while state machines 113 and 123 utilize the second, third, and fourth orders. Some state machines may be exempted from the header compression procedure altogether.

During fourth order header compression, transmitter circuitry 101 may execute transmitter state machines 111-114 for respective protocols A-D to process data packets with full headers. The packets with full headers may originate in a user data application, media server, or some other source. Transmitter circuitry 101 determines if one of the transmitter state machines 111-114 is transferring any Interdependent Machine Output (IMO) data in a data packet. Transmitter circuitry 110 generates an IMO vector bit for each data packet that indicates if any IMO data is transferred in that data packet. If all IMO vector bits are zero (no IMO), then a single-bit IMO vector is used. If any IMO data is transferred in the data packet, then the transmitting state machine reverts to the third compression order and transmitter circuitry 101 augments the IMO vectors to indicate the individual state machines associated with the third order IMO data.

Transmitter circuitry 101 transfers data packets with the IMO vector to receiver circuitry 102. Receiver circuitry 102 processes the IMO vector (perhaps just a single bit) to determine if any IMO data is transferred in the data packet. If the IMO vector indicates that IMO data is transferred in the data packet, then receiver circuitry 102 processes the IMO vector to identify the individual receiver state machines for the IMO data. Receiver circuitry 102 transfers the IMO data to the individual receiver state machines 121-124 that correspond to the individual transmitter state machines 111-114 that transferred the IMO data. These corresponding receiver state machines also revert to third order compression to process the IMO data. If the single-bit IMO vector indicates that no IMO data is in the data packet, then receiver state machines 121-124 remain in fourth order compression and process the IMO vector bit and other information to infer header data.

In some examples, state machines 111-114 and 121-124 also generate communication usage data based on the packet length metrics from the Layer 1 device. For example, state machines 111-114 and 121-124 may generate total data amounts per time period per user IP address based on packet length data and system time from a layer one controller, A/D, and the like.

In some examples, additional data is handled in the manner of the IMO data. Like the IMO data, the additional data is indicated by the IMO vectors. Also like the IMO data, the IMO vectors can be augmented to indicate the transmitter/receiver state machines requiring the additional data. For example, transmitter circuitry 101 may detect if one of transmitter state machines 111-114 reverts from third order compression to second order compression (or first order compression). Transmitter circuitry 101 then indicates in the single-bit IMO vector if any IMO data is present OR if any transmitter state machines 111-114 have reverted down from third order compression. Transmitter circuitry 101 augments the IMO vector as needed to indicate the individual transmitter state machines 111-114 that have moved below third order compression. Receiver circuitry 102 transfers the additional data like the particular order changes or error correction data to the corresponding receiver state machines 121-124 based on the augmented IMO vector. For example, receiver circuitry 102 may transfer third-to-second order changes, sequence, and error correction data to individual receiver state machines 121-124 that are reverting to second order compression.

An IMO vector may comprise a series of bit sets with a bit set for each transmitting-receiving pair of state machines. The individual state machines are designated by their relative position in the vector. The first bit in a given bit set may indicate the presence of IMO data with a 1. The second bit in the bit set may indicate a particular compression order change with a 1.

Additional bits could be added to the bit set for additional status operations. The single-bit IMO vector occurs when the OR of all IMO vector bits from all transmitting SMs is 0—meaning that no IMO data is present and that none of the particular compression order changes have occurred.

Figure 2:
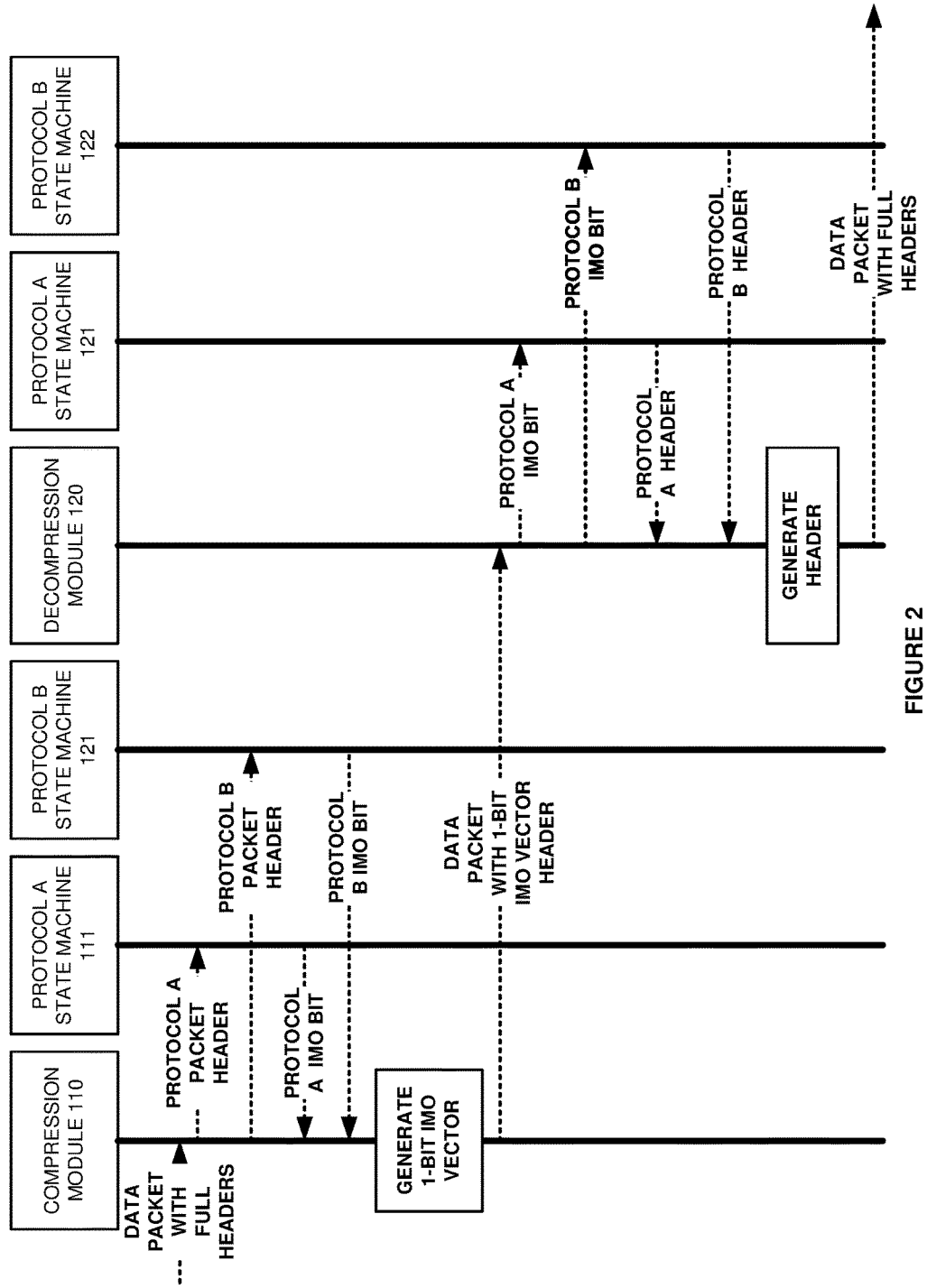
FIG. 2 illustrates the operation of the data communication system to transfer data communication packets with compressed headers.

FIG. 2 illustrates the operation of data communication system 100 to transfer data communication packets with compressed headers. During fourth order compression, compression module 110 receives data packets with full headers for protocols A-B. Additional state machines and protocols could be included but are omitted for clarity. Compression module 110 transfers the protocol A header to protocol A state machine 111 and transfers the protocol B header to protocol B state machine 112. State machines 111-112 return respective IMO bits indicating if they are transferring IMO data in a data packet. Compression module 110 processes the respective IMO bits to generate an IMO vector. If no IMO data is sent, then the IMO vector may simply be a single bit. If IMO data is sent, then the single IMO vector bit is followed by additional bits to indicate the individual transmitting and/or receiving state machines.

In this example, no IMO data is sent so compression module 110 generates a single-bit IMO vector. Compression module 110 transfers the data packet from transmitter circuitry 101 to decompression module 120 in receiver circuitry 102. The data packet comprises a payload and the single-bit IMO vector as the header. Decompression module 120 processes the IMO vector to deliver corresponding IMO vector bits to receiver state machines 121-122. If an augmented IMO vector and IMO data had been present, then decompression module 120 would have transferred the IMO data to the proper receiver state machines based on the augmented IMO vector.

State machine 121 processes the single-bit IMO vector to generate a header for protocol A—typically a copy of the last protocol A header that is modified with inferred data like sequence number and packet size. State machine 122 processes the single-bit IMO vector to generate a header for protocol B—typically a copy of the last protocol B header that is modified with inferred data like sequence number and packet size. Decompression module 120 generates a full packet header from the protocol headers. Decompression module 120 transfers the data packet with a full packet header for protocols A and B.

If the IMO vector had indicated that IMO data was transferred in the data packet, then decompression module 120 processes the IMO vector to identify the individual state machines for the IMO data. Decompression module 120 then transfers the IMO data to the individual receiver state machines 121-124 that correspond to the individual transmitter state machines 111-114 that transferred the IMO data. These corresponding receiver state machines would return their protocol headers based on the IMO data.

State machines 111-112 and 121-122 may generate communication usage data based on the packet length metrics from a Layer 1 device. For example, the state machines may generate total data transfer amounts per time period per user IP address based on the packet length data and system time from an A/D circuit. In another example, the state machines generate data indicating compression efficiency, savings, and the like.

In some examples, additional data is handled like the IMO data. For example, the additional data may indicate a particular compression order change like order 3 to order 2. Like the IMO data, the augmented IMO vector indicates the individual transmitting and/or receiving state machines undergoing the compression order change. Like the IMO data, the single-bit IMO vector indicates a lack of any compression order change.

Figure 3:
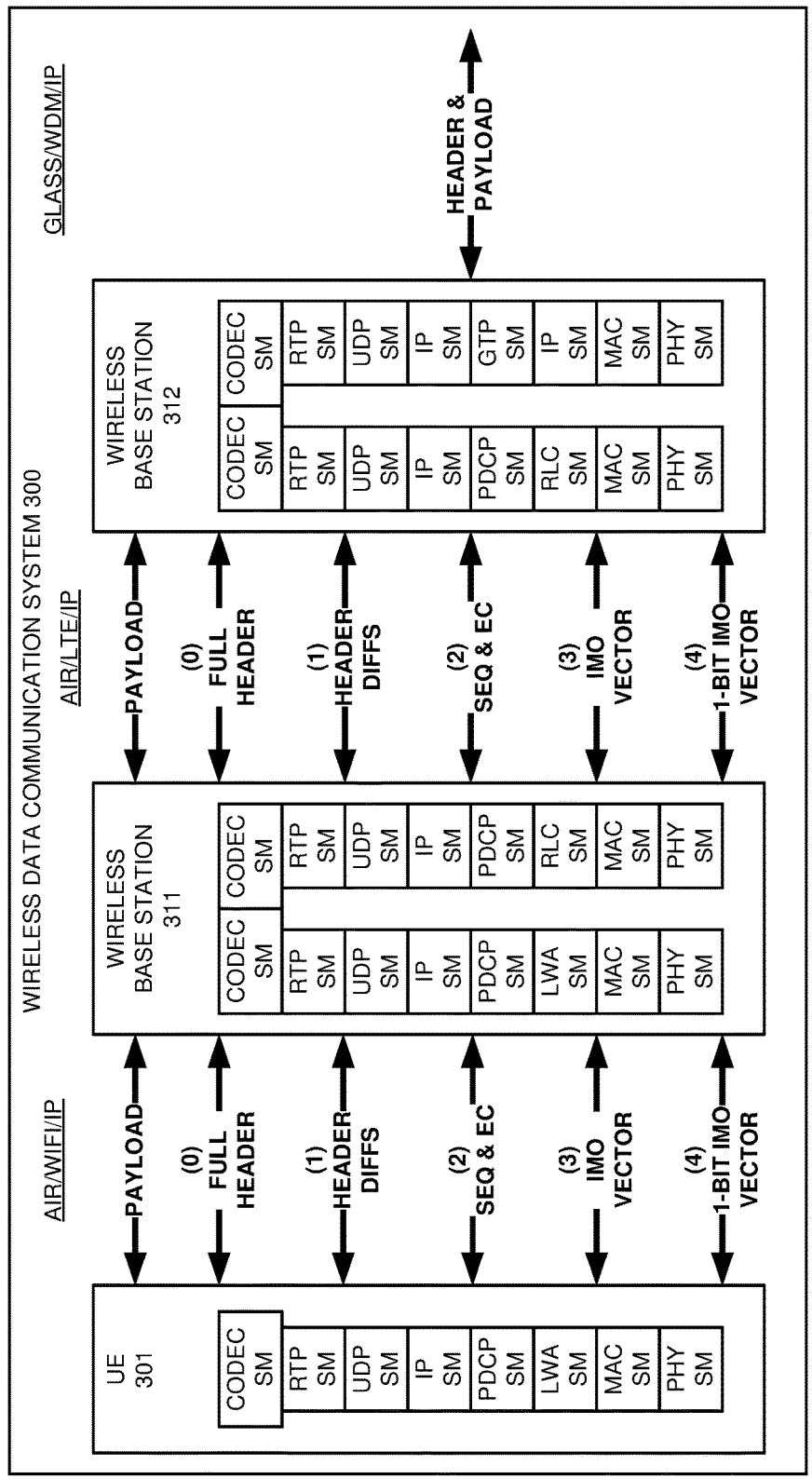
FIG. 3 illustrates a wireless data communication system to transfer data communication packets with compressed headers.

FIG. 3 illustrates the wireless data communication system 300 to transfer data communication packets with compressed headers. Wireless data communication system 300 is an example of data system 100, although system 100 may use alternative configurations and operations. Wireless data communication system 300 comprises User Equipment (UE) 301, wireless base station 311, and wireless base station 312. UE and wireless base station 311 communicate over the air using IEEE 802.11 (Wi-Fi) frames to transport IP data packets. Wireless base station 311 and wireless base station 312 communicate over the air using LTE resource blocks to transport IP data packets. Wireless base station 312 and a core network gateway (not shown) communicate over glass using WDM wavelengths to transport IP data packets. The communication layers are exemplary and other layers like Ethernet and DOCSIS could be used.

Wireless base station 311 is a relay base station, and wireless base station 312 is a macro base station. Additional relays like base station 311 could be deployed between UE 301 and macro base station 312 but only one is shown for clarity. Wireless data communication system 300 represents a multi-hop wireless access network where header compression is especially effective. Although header compression could be used from end-to-end through the network and beyond, the present example applies header compression over the air between UE 301 and macro base station 312.

UE 301 comprises various State Machines (SMs) that are linked into a protocol stack. The UE 301 protocol stack comprises: Physical Layer (PHY) SM, MAC SM (for IEEE 802.11-Wi-Fi), LTE/Wi-Fi Aggregation (LWA) SM, PDCP SM, IP SM, User Datagram Protocol (UDP) SM, Real-time Transfer Protocol (RTP) SM, and a codec SM. On the UE side, the protocol stack for base station 311 comprises: PHY SM, MAC SM (for Wi-Fi), LWA SM, PDCP SM, IP SM, UDP SM, RTP SM, and a codec SM. On the network side, the base station 311 protocol stack comprises: PHY SM, MAC SM (for LTE), RLC SM, PDCP SM, IP SM, UDP SM, RTP SM, and a codec SM. Toward the UE, macro base station 312 has a protocol stack that comprises: PHY SM, MAC SM (for LTE), RLC SM, PDCP SM, IP SM, UDP SM, RTP SM, and a codec SM. On the network side, the base station 312 protocol stack comprises: PHY SM, MAC SM (for WDM), IP SM, General Purpose Radio Service Transfer Protocol (GTP) SM, IP SM, UDP SM, RTP SM, and a codec SM. These communication protocol are exemplary and others could be used as needed.

Header compression orders 0-4 are shown for use between UE 301 and base station 312. In zero order compression, the SMs initialize with data for the packet flow, so full headers are sent. In first order compression, the transmitting SMs transfer header differences from the initialization state and the receiving SMs regenerate the headers from the differences and stored header data. In second order compression, the SMs transfer sequence numbers (SEQ) and error correction data (EC), and the receiving SMs regenerate the headers from the SEQ, EC, and Layer 1 data like packet length and system time.

In third order compression, the SMs transfer IMO vectors that indicate the presence of IMO data or "delta" data. The delta data indicates a particular compression order change. In this example, the delta data indicates when the compression order falls below the third order to the second order. If any IMO data or delta data is transferred, then the IMO vector is augmented to indicate the specific state machine or machines that sent the IMO data or that fell below third order compression. The receiving SMs regenerate the headers from the IMO vectors, IMO data, Layer 1 data, and stored data. In some examples, the second compression order is omitted, and the state machines would directly transition between the first order and the third order.

In fourth order compression, the SMs transfer a single-bit IMO vector. The single-bit IMO vector indicates a lack of any IMO data or any delta data in the data packet. If any IMO data or delta data were present, then the IMO vector would be augmented to indicate pertinent state machines and the IMO data or delta data would be fed to the proper state machines based on the augmented IMO vector. Since no IMO data or delta data is present in the fourth order, the receiving SMs are fed the IMO vector bit. The receiving SMs regenerate the headers from the IMO bit, Layer 1 data, and stored data. Header compression toggles between the third and fourth orders as IMO data or delta data is transferred. Note that corresponding transmitter/receiver state machines (like UDP) should stay in the same compression order, but transmitter state machines (like MAC and IP) may use different compression orders.

Figure 4:
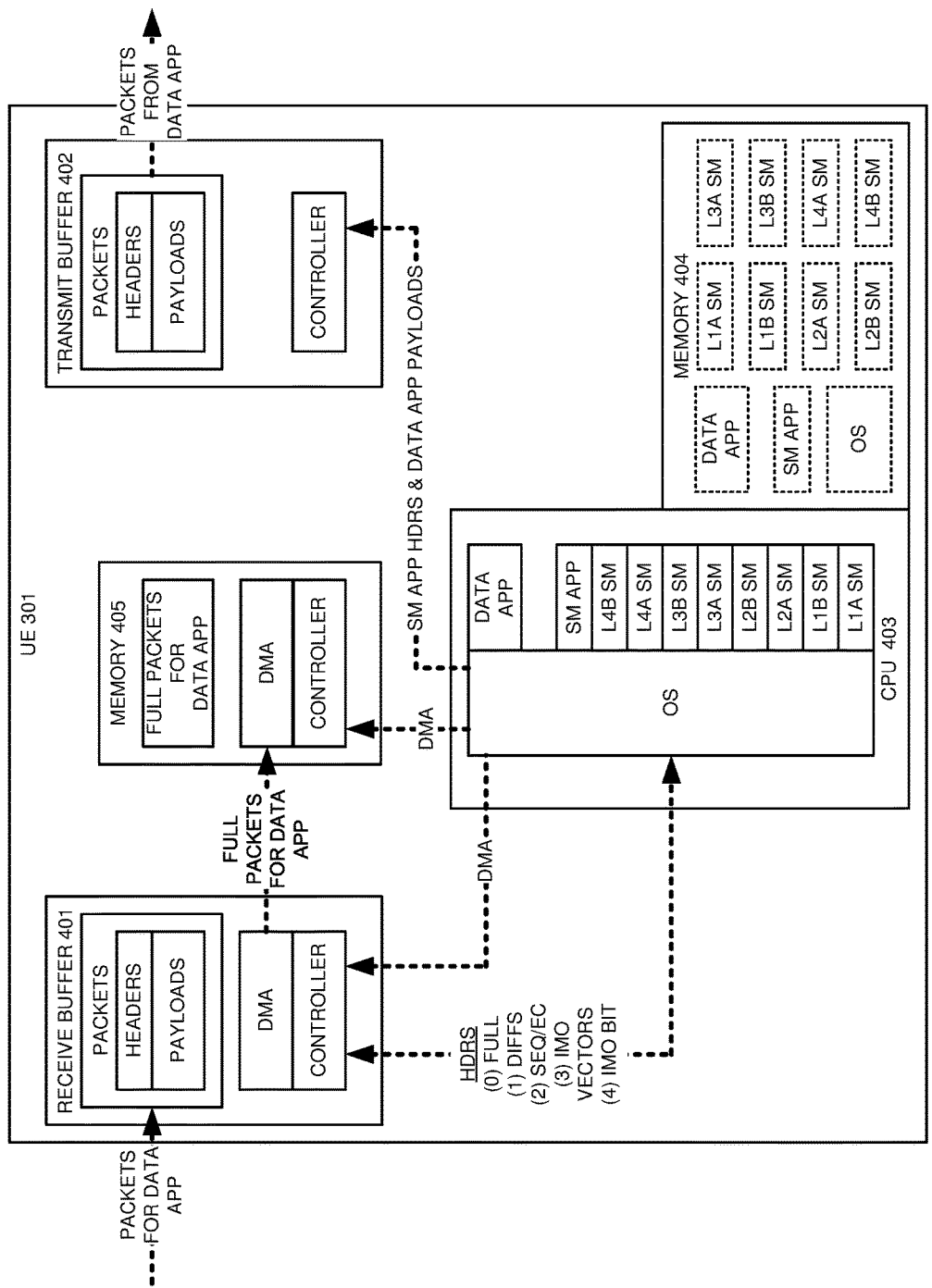
FIG. 4 illustrates wireless User Equipment (UE) to exchange data communication packets with compressed headers.

FIG. 4 illustrates wireless User Equipment (UE) 301 to transfer data communication packets with compressed headers. UE 301 comprises receive buffer 401, transmit buffer 402, CPU 403, and memories 404-405. Memory 404 stores various software modules for CPU 403, such as an Operating System (OS), State Machine application (SM app), data application, and various SMs for Layers 1-4. CPU 403 retrieves and executes this software. The data app directs the OS to establish network connectivity and initiate a packet flow. The OS uses the Layer 1-4 SMs to process the data packets and apply header compression.

The header compression for a packet flow from UE 301 toward the network is first described. In zero order compression, the Layer 1-4 SMs initialize with data for the packet flow, so full headers are sent to the SM app. The SM app directs the OS to transfer the full protocol headers to transmit buffer 402. The OS also transfers the data app payloads to transmit buffer 402. Transmit buffer 402 transmits the packets with full headers and the payloads.

In first order compression, the Layer 1-4 SMs transfer header differences from their initialization state, so headers differences are sent to the SM app. The SM app directs the OS to transfer the protocol header differences to transmit buffer 402. The OS also transfers the data app payloads to transmit buffer 402. Transmit buffer 402 transmits the data packets with the header differences and the payloads.

In second order compression, the Layer 1-4 SMs transfer sequence numbers and error correction data, so the sequence numbers and error correction data are sent to the SM app. The SM app directs the OS to transfer the sequence numbers and error correction data to transmit buffer 402. The OS also transfers the data app payloads to transmit buffer 402. Transmit buffer 402 transmits the packets with the sequence numbers, error correction data, and payloads.

In third order compression, the Layer 1-4 SMs transfer IMO vectors that indicate the presence of IMO data or delta data. In this example, the delta data indicates when the compression order for a specific SM changes from the third order to the second order. When IMO data or delta data is present, the SM app generates an IMO vector indicating which individual SMs produced the IMO data or the delta data. The SM directs the OS to transfer the IMO vectors and the IMO data to transmit buffer 402. The OS also transfers the data app payloads to transmit buffer 402. Transmit buffer 402 transmits the packets with the IMO vectors, IMO data, and payloads.

In fourth order compression, the Layer 1-4 SMs transfer a single-bit IMO vectors indicating a lack of IMO data or delta data. The SM app integrates the individual IMO vector bits into the single-bit IMO vectors for the data packets. The SM app directs the OS to transfer the single-bit IMO vectors to transmit buffer 402. The OS also transfers the data app payloads to transmit buffer 402. Transmit buffer 402 transmits the packets with only the single-bit IMO vectors and the payloads.

Header compression for a packet flow in the other direction from the network to UE 301 is now described. Receive buffer 401 receives data packets with headers and payloads for delivery to the data app and interrupts CPU 403 and the OS. The OS transfers the headers to the SM app. In zero order compression, the OS sends full headers to the SM app which forwards the full headers to the Layer 1-4 SMs. The Layer 1-4 SMs process the full headers to initialize. The SM app directs the OS to transfer the full protocol headers and payloads to memory 405 for consumption by the data app.

In first order compression, the OS sends header differences to the SM app. The SM app forwards the header differences to the Layer 1-4 SMs. The Layer 1-4 SMs process the header differences to regenerate full headers from the differences, external data, and stored data. The SM app directs the OS to transfer the full protocol headers to receive buffer 401. The OS initiates a Direct Memory Access (DMA) transfer of the payloads and full headers from receive buffer 401 to memory 405 for consumption by the data app. The OS may write the full headers directly to memory 405 if desired.

In second order compression, the OS sends sequence numbers and checksums to the SM app. The SM app forwards the sequence numbers and checksums to the Layer 1-4 SMs. The Layer 1-4 SMs process the sequence numbers and the checksums to generate full headers from the sequence numbers and checksums, external data, and stored data. The SM app directs the OS to transfer the full protocol headers to receive buffer 401, and the OS initiates a DMA transfer of the payloads and full headers to memory 405 for consumption by the data app. The OS may write the full headers directly to memory 405 if desired.

In third order compression, the OS sends IMO vectors and IMO data to the SM app. The SM app processes the IMO vectors to forward the IMO vector bits and IMO data to the appropriate Layer 1-4 SMs. The Layer 1-4 SMs process their individual IMO vector bits and IMO data to generate full headers from the IMO data, external data, and stored data. The SM app directs the OS to transfer the full protocol headers to receive buffer 401, and the OS initiates a DMA transfer of the payloads and full headers to memory 405 for consumption by the data app. The OS may write the full headers directly to memory 405 if desired.

In fourth order compression, the OS sends single-bit IMO vectors to the SM app for possible decompression. The SM app processes the single-bit IMO vectors to forward the IMO vector bit to the Layer 1-4 SMs. The Layer 1-4 SMs process the IMO vector bit to generate full headers from the bit, external data, and stored data. The SM app directs the OS to transfer the full protocol headers to receive buffer 401, and the OS initiates a DMA transfer of the payloads and full headers to memory 405 for consumption by the data app. The OS may write the full headers directly to memory 405 if desired.

Figure 5:
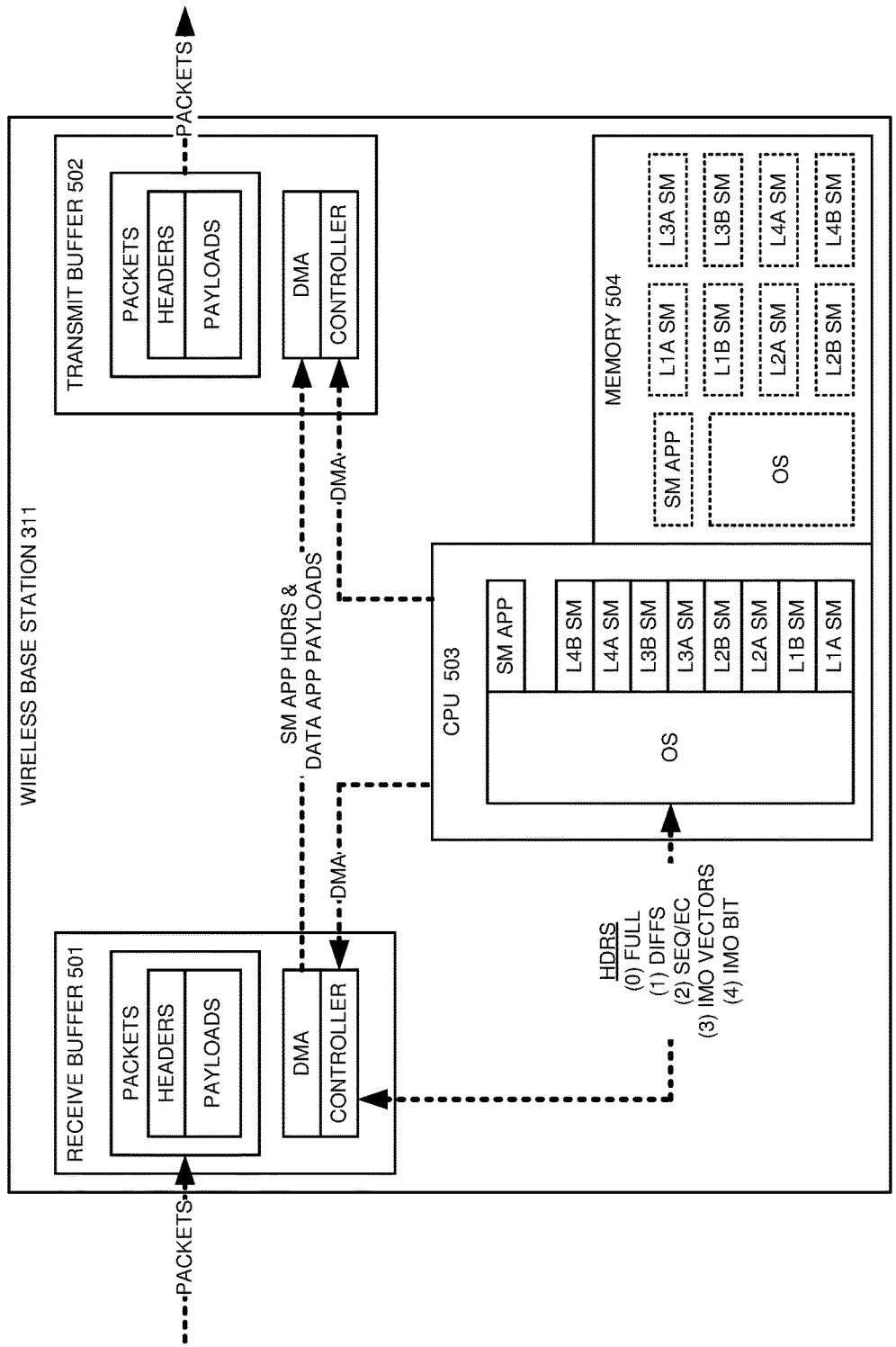
FIG. 5 illustrates a wireless relay base station to exchange data communication packets with compressed headers.

FIG. 5 illustrates wireless base station 311 to exchange data communication packets with compressed headers. Wireless base station 311 comprises receive buffer 501, transmit buffer 502, CPU 503, and memory 504. Memory 504 stores various software modules for CPU 503, such as an OS, SM app, and various SMs for Layers 1-4. CPU 503 retrieves and executes this software. The OS uses the Layer 1-4 SMs to process data packets and apply header compression. The base station Layer 1-4 SMs also generate data communication usage data based on packet length metrics and system time that is received from Layer 1 systems.

Header compression for a packet flow from UE 301 toward the network is described. A reciprocal process would occur for a flow in the other direction. Receive buffer 501 receives data packets with headers and payloads and interrupts CPU 503 and the OS. The OS transfer the headers to the SM app. In zero order compression, the OS sends full headers to the SM app, and the SM app forwards the full headers to the Layer 1-4 SMs. The Layer 1-4 SMs process the full headers to initialize. The initializing Layer 1-4 SMs return full headers to the SM app. The SM app directs the OS to transfer the full protocol headers to transmit buffer 502. The OS initiates a DMA transfer of the full headers and payloads from receive buffer 501 to transmit buffer 502, although the OS may write the full headers directly to transmit buffer 502. Transmit buffer 502 transmits the data packets with full headers and the payloads.

In first order compression, the OS sends header differences to the SM app, and the SM app forwards the header differences to the Layer 1-4 SMs. The Layer 1-4 SMs process the header differences—perhaps to regenerate the full headers and develop new header differences. The first order SMs return their header differences to the SM app. The SM app directs the OS to transfer header differences to transmit buffer 502. The OS initiates a DMA transfer of the header differences and payloads from receive buffer 501 to transmit buffer 502, although the OS may write the header differences directly to transmit buffer 502. Transmit buffer 502 transmits the data packets with the header differences and the payloads.

In second order compression, the OS sends sequence numbers and checksums to the SM app. The SM app forwards the sequence numbers and checksums to the Layer 1-4 SMs. The Layer 1-4 SMs process the sequence numbers and checksums—perhaps to regenerate the full headers and develop new sequence numbers and checksums. The first order SMs return their sequence numbers and checksums to the SM app. The SM app directs the OS to transfer the sequence numbers and checksums to transmit buffer 502. The OS initiates a DMA transfer of the sequence numbers, checksums, and payloads from receive buffer 501 to transmit buffer 502, although the OS may write the sequence numbers and checksums directly to transmit buffer 502. Transmit buffer 502 transmits the data packets with the sequence numbers, checksums, and the payloads.

In third order compression, the OS sends IMO vectors and IMO data to the SM app for decompression. The SM app processes the IMO vectors to transfer the IMO vector bits (including delta bits) and IMO data to the individual Layer 1-4 SMs. The Layer 1-4 SMs process the IMO vector bits and data—perhaps to regenerate the full headers and develop new IMO data. The third order SMs return their IMO data and/or delta level data to the SM app. The SM app generates an IMO vector to indicate the presence of IMO data, to indicate the presence of delta data, and to indicate the sending and/or receiving SMs. The SM app directs the OS to transfer the IMO vector and IMO data to transmit buffer 502. The OS initiates a DMA transfer of the IMO vector, IMO data, and payloads from receive buffer 501 to transmit buffer 502, although the OS may write the IMO vectors and IMO data directly to transmit buffer 502. Transmit buffer 502 transmits the data packets with the IMO vectors (including delta bits), IMO data, and the payloads.

In fourth order compression, the OS sends single-bit IMO vectors to the SM app for decompression. The SM app processes the single-bit IMO vectors to transfer the IMO bit data to the individual Layer 1-4 SMs. The Layer 1-4 SMs process the IMO bit—perhaps to regenerate the full headers and develop new IMO data. The fourth order SMs return their IMO bit and delta bit to the SM app. The SM app either reverts to the third order or generates single-bit IMO vectors to indicate the lack of IMO data or delta data. The SM app directs the OS to transfer the single-bit IMO vectors to transmit buffer 502. The OS initiates a DMA transfer of the single-bit IMO vectors and payloads from receive buffer 501 to transmit buffer 502, although the OS may write the single-bit IMO vectors directly to transmit buffer 502. Transmit buffer 502 transmits the data packets with the single-bit IMO vectors and the payloads.

Figure 6:
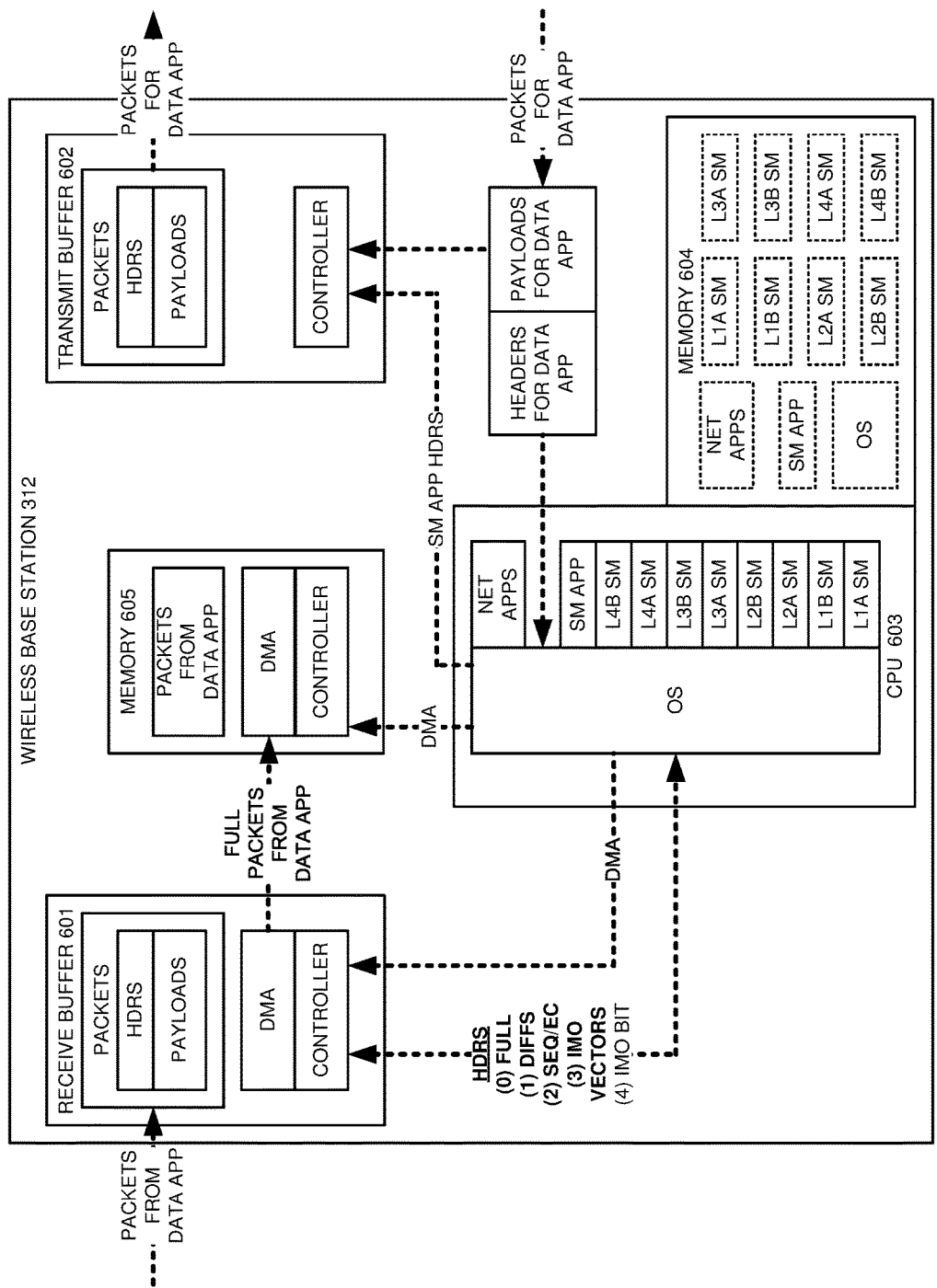
FIG. 6 illustrates wireless macro base station to exchange data communication packets with compressed headers.

FIG. 6 illustrates wireless macro base station 312 to transfer data communication packets with compressed headers. Base station 312 comprises receive buffer 601, transmit buffer 602, CPU 603, and memories 604-605. Memory 604 stores various software modules for CPU 603, such as an OS, SM app, network apps, and various SMs for Layers 1-4. CPU 603 retrieves and executes this software.

The header compression for a packet flow from the network to UE 301 is first described. For clarity, the receipt of the data packets from the network for delivery to UE 301 is simply represented in block form and could be conventional. Eventually, the OS receives the headers and transmit buffer 602 receives the payloads. The OS uses the Layer 1-4 SMs to process the packet headers and apply header compression.

In zero order compression, the Layer 1-4 SMs initialize with data for the packet flow, so full headers are sent to the SM app. The SM app directs the OS to transfer the full protocol headers to transmit buffer 602. Transmit buffer 602 transmits the packets with full headers and the payloads. In first order compression, the Layer 1-4 SMs transfer header differences from their initialization state, so headers differences are sent to the SM app. The SM app directs the OS to transfer the protocol header differences to transmit buffer 602. Transmit buffer 602 transmits the data packets with the header differences and the payloads. In second order compression, the Layer 1-4 SMs transfer sequence numbers and error correction data, so the sequence numbers and error correction data are sent to the SM app. The SM app directs the OS to transfer the protocol sequence numbers and error correction data to transmit buffer 602. Transmit buffer 602 transmits the packets with the sequence numbers, error correction data, and the payloads.

In third order compression, the Layer 1-4 SMs transfer IMO vectors that indicate the presence of IMO data or delta data. The delta data indicates when the compression order for a specific SM changes from the third order to the second order. When IMO data or delta data is present, the SM app generates an IMO vector indicating which individual SMs produced the IMO data or the delta data. The SM directs the OS to transfer the IMO vectors (with delta bits) and the IMO data to transmit buffer 602. Transmit buffer 602 transmits the data packets with the IMO vectors, IMO data, and the payloads. In fourth order compression, the Layer 1-4 SMs transfer single-bit IMO vectors indicating a lack of IMO data or delta data. The SM app integrates the individual IMO vectors into single-bit IMO vectors for the data packets. The SM app directs the OS to transfer the single-bit IMO vectors to transmit buffer 602. Transmit buffer 602 transmits the packets with only the single-bit IMO vectors and the payloads.

The header compression for a packet flow from UE 301 to the network is now described. Receive buffer 601 receives data packets with headers and payloads for the network apps and interrupts CPU 603 and the OS. The OS transfers the headers to the SM app. In zero order compression, the OS sends full headers to the SM app which forwards the full headers to the Layer 1-4 SMs. The Layer 1-4 SMs process the full headers to initialize. The SM app directs the OS to transfer the full protocol headers and payloads to memory 605 for consumption by the network apps (and subsequent transfer). The OS initiates a DMA transfer of the full protocol headers and payloads from receive buffer 601 to memory 605, although the OS may write the full protocol headers directly to memory 605.

In first order compression, the OS sends header differences to the SM app which forwards the header differences to the Layer 1-4 SMs. The Layer 1-4 SMs process the header differences to regenerate full headers from the differences, external data, and stored data. The SM app directs the OS to transfer the full protocol headers and payloads to memory 605 for consumption by the network apps (and subsequent transfer). The OS initiates a DMA transfer of the full protocol headers and payloads from receive buffer 601 to memory 605, although the OS may write the full protocol headers directly to memory 605.

In second order compression, the OS sends sequence numbers and checksums to the SM app which forwards the sequence numbers and checksums to the Layer 1-4 SMs. The Layer 1-4 SMs process the sequence numbers and the checksums to generate full headers from the sequence numbers and checksums, external data, and stored data. The SM app directs the OS to transfer the full protocol headers and payloads to memory 605 for consumption by the network apps (and subsequent transfer). The OS initiates a DMA transfer of the full protocol headers and payloads from receive buffer 601 to memory 605, although the OS may write the full protocol headers directly to memory 605.

In third order compression, the OS sends IMO vectors with delta bits and IMO data to the SM app which processes the IMO vectors to forward the IMO vector bits and IMO data to the appropriate Layer 1-4 SMs. The Layer 1-4 SMs process their individual IMO vector bits and IMO data to generate full headers from the IMO data, external data, and stored data. The SM app directs the OS to transfer the full protocol headers and payloads to memory 605 for consumption by the network apps. The OS initiates a DMA transfer of the full protocol headers and payloads from receive buffer 601 to memory 605, although the OS may write the full protocol headers directly to memory 605.

In fourth order compression, the OS sends single-bit IMO vectors to the SM app which forwards the single-bit IMO vectors to the Layer 1-4 SMs. The Layer 1-4 SMs process their single IMO vector bits to generate full headers from the bits, external data, and stored data. The SM app directs the OS to transfer the full protocol headers and payloads to memory 605 for consumption by the network apps. The OS initiates a DMA transfer of the full protocol headers and payloads from receive buffer 601 to memory 605, although the OS may write the full protocol headers directly to memory 605.

Figure 7:
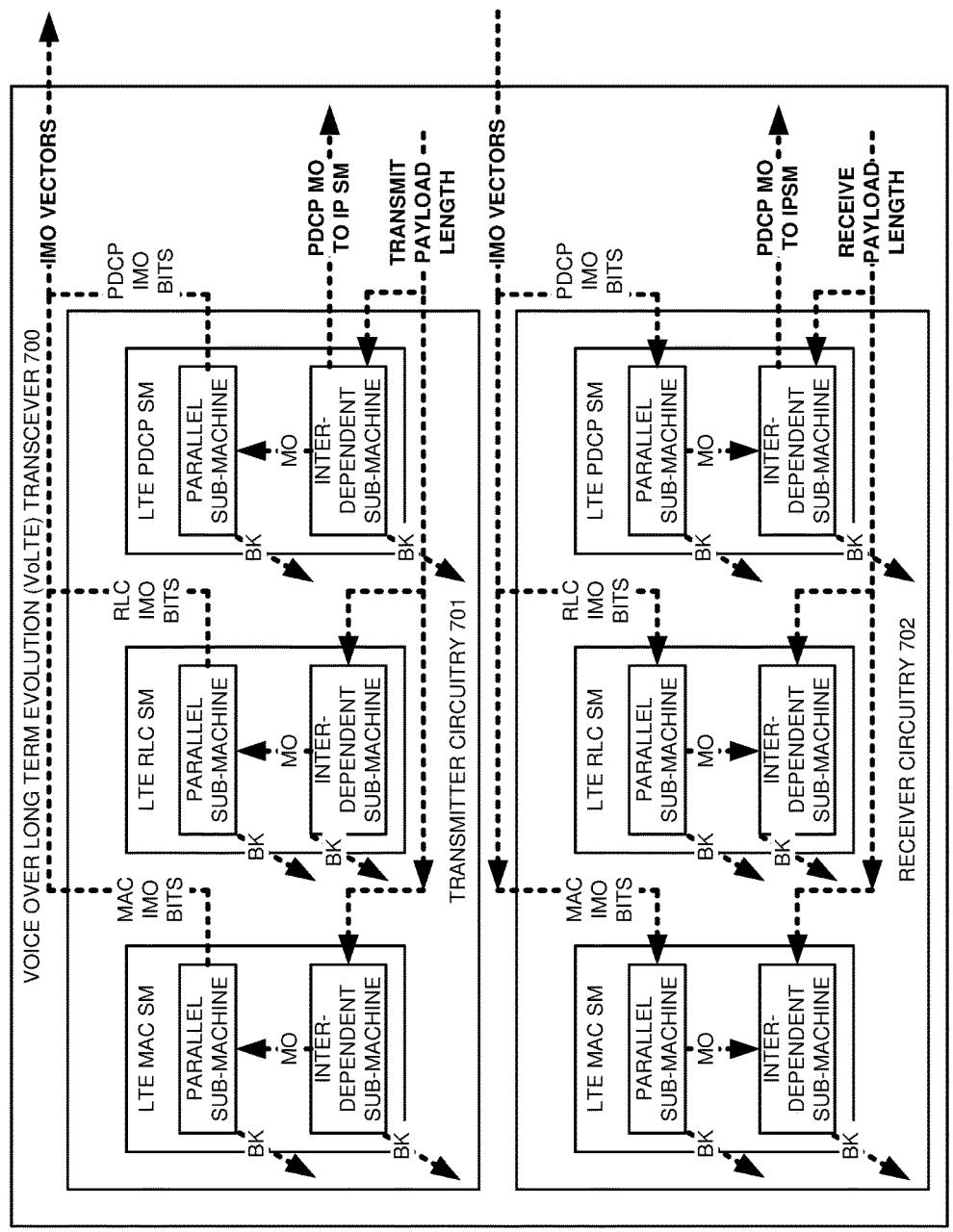
FIG. 7 illustrates a Voice over Long Term Evolution (VoLTE) transceiver to exchange data communication packets with compressed headers.

FIG. 7 illustrates Voice over Long Term Evolution (VoLTE) transceiver 700 to exchange data communication packets with compressed headers. VoLTE transceiver 700 comprises transmitter circuitry 701 and receiver circuitry 702. Transmitter circuitry 701 and receiver circuitry 702 each comprise an LTE MAC SM, LTE RLC SM, and PDCP SM. Transmitter circuitry 701 and receiver circuitry further include SMs for IP, UDP, and RTP but these SMs could be conventional and are omitted for clarity. The MAC, RLC, and PDCP SMs apply header compression orders as described above.

The parallel sub-machines of receiver circuitry 702 receive their IMO bits from the incoming IMO vectors and generate Bookkeeping data (BK). The parallel sub-machines also generate MO data for their corresponding interdependent sub-machines. The interdependent sub-machines process the MO data and payload length (from a Layer 1 A/D) to generate BK that includes per-user data usage metrics and compression savings. The interdependent PDCP sub-machine in receiver circuitry 702 also generates standard MO data for the receiver IP SM (not shown).

In transmitter circuitry 701, the interdependent sub-machines process payload length (from a Layer 1 A/D) to generate BK that includes per-user data usage metrics and compression savings. The interdependent sub-machines also produce MO data for their corresponding parallel sub-machines. The parallel sub-machines generate BK and also generate their IMO and delta bits for the outgoing IMO vectors. The interdependent PDCP sub-machine in transmitter circuitry 701 generates standard MO data for the transmitter IP SM (not shown).

In VoLTE operations, Semi-Persistent Scheduling (SPS) may be used to maintain a static correlation between the LTE resource blocks and the VoLTE bearer. The static correlation allows Segmentation and Reassembly (SAR) to be omitted if desired. Using SPS, a VoLTE payload may be sent every 20 milliseconds—at the beginning of every other LTE frame, although other 10 millisecond multiples and LTE frame alignments could be used. Because the mapping between the physical resource blocks and the RLC layer is known due to SPS, the MAC SMs run in BK mode and produce BK data from the payload length data. Because SAR is eliminated, the RLC SMs run in BK mode and produce BK data from the payload length data. The LTE MAC, RLC, and PDCP SMs may be compiled using Common Expression Elimination (CSE). Because only one RTP flow exists in each direction, the PDCP context ID is unnecessary and is not used. Thus for most VoLTE packets, the header will only have a single-bit for the MAC, RLC, and PDCP headers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to perform packet header compression, the method comprising:

internal transmitter circuitry transferring first data payloads with first packet headers to a first state machine in external receiver circuitry to initialize the first state machine in the external receiver circuitry with first header data, and when the first state machine in the external receiver circuitry has initialized with the first header data, the internal transmitter circuitry stopping the transfer of the first packet headers and transferring second data payloads with first packet header differences to the first state machine in the external receiver circuitry;

when the first packet header differences are stable and there is first Interdependent Machine Output (IMO) data to transfer to the first state machine, the internal transmitter circuitry stopping the transfer of the packet header differences and transferring third data payloads with the first IMO data to the first state machine in the external receiver circuitry; and when there is no first IMO data to transfer to the first state machine and the first packet header differences stable, the internal transmitter circuitry stopping the transfer of the first IMO data and transferring fourth data payloads with an IMO code that indicates a lack of the first IMO data for the first state machine in the external receiver circuitry.

2. The method of claim 1 further comprising:
   the internal receiver circuitry receiving fifth data payloads with fifth packet headers from external transmitter circuitry to initialize a second state machine in the internal receiver circuitry with fifth header data, and when the second state machine in the internal receiver circuitry has initialized with the fifth header data, the internal receiver circuitry stopping the receipt of the fifth packet headers and receiving sixth data payloads with second packet header differences from the external transmitter circuitry;

when the second packet header differences are stable and there is second IMO data to receive for the second state machine, the internal receiver circuitry stopping the receipt of the packet header differences and receiving seventh data payloads with the second IMO data from the external transmitter circuitry; and when there is no second IMO data to receive for the second state machine and the second packet header differences stable, the internal receiver circuitry stopping the receipt of the second IMO data and receiving eighth data payloads with the IMO code that indicates the lack of the IMO data for the second state machine in the internal receiver circuitry.

3. The method of claim 1 further comprising, when the first packet header differences are stable and there is first IMO data to transfer to the first state machine, the internal transmitter circuitry transferring IMO vectors to the external receiver circuitry that indicate the first state machine in the external receiver circuitry to process the first IMO data.

4. The method of claim 1 further comprising, when the second packet header differences are stable and there is second IMO data to receive, internal receiver circuitry receiving IMO vectors and second IMO data from external transmitter circuitry that indicate a second state machine in the internal receiver circuitry to process the second IMO data and transferring the second IMO data to the second state machine in the internal receiver circuitry based on the IMO vectors.

5. The method of claim 1 further comprising internal receiver circuitry inferring packet length from information received from an Analog-to-Digital (A/D) converter.

6. The method of claim 1 further comprising internal receiver circuitry inferring payload length from information received from an Analog-to-Digital (A/D) converter.

7. The method of claim 1 further comprising internal receiver circuitry inferring header length from information received from an Analog-to-Digital (A/D) converter.

8. The method of claim 1 wherein the first state machine comprises a Media Access Control (MAC) state machine.

9. The method of claim 1 wherein the first state machine comprises a Radio Link Control (RLC) state machine.

10. The method of claim 1 wherein the first state machine comprises a Packet Data Convergence Protocol (PDCP) state machine.

11. A wireless communication device to perform packet header compression, the wireless communication device comprising:

internal transmitter circuitry configured to transfer first data payloads with first packet headers to a first state machine in external receiver circuitry to initialize the first state machine in the external receiver circuitry with first header data, and when the first state machine in the external receiver circuitry has initialized with the first header data, the internal transmitter circuitry configured to stop the transfer of the first packet headers and transfer second data payloads with first packet header differences to the first state machine in the external receiver circuitry;

when the first packet header differences are stable and there is first Interdependent Machine Output (IMO) data to transfer to the first state machine, the internal transmitter circuitry configured to stop the transfer of the packet header differences and transfer third data payloads with the first IMO data to the first state machine in the external receiver circuitry; and when there is no first IMO data to transfer to the first state machine and the first packet header differences stable, the internal transmitter circuitry configured to stop the transfer of the first IMO data and transfer fourth data payloads with an IMO code that indicates a lack of the first IMO data for the first state machine in the external receiver circuitry.

12. The wireless communication device of claim 11 further comprising:

the internal receiver circuitry configured to receive fifth data payloads with fifth packet headers from external transmitter circuitry to initialize a second state machine in the internal receiver circuitry with fifth header data, and when the second state machine in the internal receiver circuitry has initialized with the fifth header data, the internal receiver circuitry configured to stop the receipt of the fifth packet headers and receive sixth data payloads with second packet header differences from the external transmitter circuitry;

when the second packet header differences are stable and there is second IMO data to receive for the second state machine, the internal receiver circuitry stopping the receipt of the packet header differences and receiving seventh data payloads with the second IMO data from the external transmitter circuitry; and when there is no second IMO data to receive for the second state machine and the second packet header differences stable, the internal receiver circuitry stopping the receipt of the second IMO data and receiving eighth data payloads with the IMO code that indicates the lack of the IMO data from the external transmitter circuitry.

13. The wireless communication device of claim 11 further comprising, when the first packet header differences are stable and there is first IMO data to transfer to the first state machine, the internal transmitter circuitry configured to transfer IMO vectors to the external receiver circuitry that indicate the first state machine in the external receiver circuitry to process the first IMO data.

14. The wireless communication device of claim 11 further comprising, when the second packet header differences are stable and there is second IMO data to receive, internal receiver circuitry configured to receive IMO vectors and second IMO data from external transmitter circuitry that indicate a second state machine in the internal receiver circuitry to process the second IMO data and transfer the second IMO data to the second state machine in the internal receiver circuitry based on the IMO vectors.

15. The wireless communication device of claim 11 further comprising internal receiver circuitry configured to infer packet length from information received from an Analog-to-Digital (A/D) converter.

16. The wireless communication device of claim 11 further comprising internal receiver circuitry configured to infer payload length from information received from an Analog-to-Digital (A/D) converter.

17. The wireless communication device of claim 11 further comprising internal receiver circuitry configured to infer header length from information received from an Analog-to-Digital (A/D) converter.

18. The wireless communication device of claim 11 wherein the first state machine comprises a Media Access Control (MAC) state machine.

19. The wireless communication device of claim 11 wherein the first state machine comprises a Radio Link Control (RLC) state machine.

20. The wireless communication device of claim 11 wherein the first state machine comprises a Packet Data Convergence Protocol (PDCP) state machine.

* * * * *